United States Patent [19]
Snyder et al.

[11] Patent Number: 5,879,566
[45] Date of Patent: Mar. 9, 1999

[54] INTEGRATED STEAM REFORMING OPERATION FOR PROCESSING ORGANIC CONTAMINATED SLUDGES AND SYSTEM

[75] Inventors: Thomas Stephen Snyder, Oak Ridge; Matthew Reed Cage, Knoxville; John Gregorie Wagner, Harriman; Bryan Arthur Roy, Lenoir City, all of Tenn.

[73] Assignee: The Scientific Ecology Group, Inc., Columbia, Md.

[21] Appl. No.: 792,411

[22] Filed: Feb. 3, 1997

[51] Int. Cl.$^6$ .............................. B01D 21/26; F23G 5/04; C03B 5/00

[52] U.S. Cl. ........................ 210/771; 210/774; 210/787; 210/806; 210/180; 210/195.1; 210/298; 210/360.1; 210/178; 65/134.6; 65/134.8; 65/141; 110/224; 110/234; 110/238; 422/189; 422/213; 422/216; 588/11; 588/252; 588/257; 55/482; 55/484; 55/523; 95/92; 95/273

[58] Field of Search .............................. 65/134.6, 134.8, 65/141; 210/194, 298, 195.1, 180, 234, 294, 178, 360.1, 297, 768, 770, 304, 771, 774, 176, 790, 805, 323.2, 806, 175; 110/224, 234, 238; 100/117, 339, 340; 422/189, 213, 216; 588/111, 252, 257; 55/482, 484, 523; 95/92, 273

[56] References Cited

U.S. PATENT DOCUMENTS

| | | | |
|---|---|---|---|
| 4,376,070 | 3/1983 | Pope et al. | |
| 4,504,317 | 3/1985 | Smeltzer et al. | |
| 4,666,490 | 5/1987 | Drake | 65/27 |
| 4,688,495 | 8/1987 | Galloway | 110/250 |
| 4,759,879 | 7/1988 | Cadoff et al. | |
| 4,863,702 | 9/1989 | Galloway et al. | 422/189 |
| 4,874,587 | 10/1989 | Galloway | 422/189 |
| 4,983,282 | 1/1991 | Roy et al. | 210/95 |
| 5,022,329 | 6/1991 | Rackley et al. | 110/234 |
| 5,288,435 | 2/1994 | Sachse et al. | 264/5 |
| 5,292,695 | 3/1994 | Galloway | 502/53 |
| 5,322,116 | 6/1994 | Galloway et al. | 165/133 |
| 5,416,251 | 5/1995 | Lomasney et al. | 588/255 |
| 5,427,738 | 6/1995 | Galloway | 422/26 |
| 5,439,496 | 8/1995 | Pieper | 65/134.6 |
| 5,470,544 | 11/1995 | Galloway | 422/213 |
| 5,474,686 | 12/1995 | Barr | 210/771 |
| 5,678,236 | 10/1997 | Macedo et al. | 65/134.6 |

OTHER PUBLICATIONS

Galloway, T.R. et al., "On–site Bio–hazardous Waste Destruction with the Synthetica Steam Detoxifier—Test Organism Kill & Chlorocarbon Destruction", Synthetica Technologies, Richmond, California, pp. 1–26 (along with a 2–page Test Report).

Taming Toxic Waste Brochure, "Stabilize Hazardous and Radioactive Waste with Vitrification Equipment Systems from EnVitCo", 5 pages.

"Introduction to Envitco, Inc.", (Toledo, OH), 1995, 11 pages.

Whitehouse, J.C. et al., "Design and Fabrication of a Transportable Vitrification System for Mixed Waste Processing", pp. 1–8 and 5 sheets of figures.

Drafting Sheet, "HTR–40T93M4 Dust Collector Assemble," Fisher–Klosterman, Inc. Louisville, KY, Dec. 7, 1994.

*Primary Examiner*—David A. Reifsnyder
*Attorney, Agent, or Firm*—Frommer Lawrence & Haug LLP

[57] ABSTRACT

A method and system for processing waste dries and reforms a sludge stream of the waste with a first reformed effluent stream to produce a gas effluent stream and a solids effluent stream. The gas effluent stream is reformed further to produce the first effluent stream, which is then directed back to the sludge stream.

24 Claims, 2 Drawing Sheets

INTEGRATED STEAM REFORMING OPERATION FOR PROCESSING ORGANIC CONTAMINATED SLUDGES AND SYSTEM

BACKGROUND OF THE INVENTION

The present invention relates to a process and system for drying organic-contaminated sludge prior to vitrification thereof. The process provides effective heat transfer and destroys organic constituents which can inhibit encapsulation through vitrification.

The effective disposal of hazardous/radioactive waste materials is a continuing problem for industry. These waste materials can take a variety of forms including combustible organic materials, or organic constituents. Many times the waste is in the form of a slurry or thick sludge which requires drying pretreatment. However, most conventional drying processes do not remove organic constituents, particularly those with low evaporation rates, or they remove but do not destroy the organic constituents. The presence of organic constituents in the vitrification process may reduce metallic ions and inhibit their encapsulation.

Early systems employed the use of incinerators to burn dried waste materials. These incinerators had problems associated with ashes, produced by incomplete combustion, entrained in the off-gas. These airborne ashes thus presented an environmental hazard if not properly treated by filtering systems. Also, problems existed with high amounts of noncombustible leachable inorganic constituents left behind in the ash.

Other systems utilized solidification with concrete, as generally taught, for example, by U.S. Pat. No. 4,504,317 to Smeltzer et al. entitled "Encapsulation of Boric Acid Slurries." Solidification with concrete, however, was in many cases undesirable due to the increase in waste volume and weight. Also, in many cases, the solids in the sludge would interfere with the concrete chemistry and cause weaknesses in the concrete.

Combination incineration-vitrification processes have also been employed to resolve problems associated with use of incinerators alone, as taught, for example, by U.S. Pat. No. 5,022,329 to Rackey et al. entitled "Cyclone Furnace For Hazardous Waste Incineration and Ash Vitrification" and U.S. Pat No. 4,666,490 to Drake entitled "Aqueous Waste Vitrification Process and Apparatus," both of which are incorporated by reference in their entireties herein. These systems entail high fuel and capital costs to provide an ash product to vitrify.

Encapsulation of waste in glass by vitrification is an extensively studied waste encapsulation process, and taught, for example by U.S. Patent No. 4,376,070 to Pope et al. entitled "Containment of Nuclear Waste;" U.S. Pat. No. 4,759,879 to Cadoff et al. entitled "Glass Former Composition and Method for Immobilizing Nuclear Waste Using the Same;" U.S. Pat. No. 5,288,435 to Sachse et al. entitled "Treatment of Radioactive Wastes;" and U.S. Pat. No. 5,416,251 to Lomasney et al. entitled "Method and Apparatus for the Solidification of Radioactive Wastes and Products Produced Thereby;" all of which are incorporated by reference in their entireties herein. However, the presence of combustible organic constituents and water in the waste decreases the viability of vitrification. The vitrification process expends energy to drive off the water, thus driving up the operating costs. Additionally, vitrifiers have a limited heat transfer area and cooling by water evaporation could provide freezing and conductivity problems in joule-heated vitrifiers. This could be designed around by increasing the size of the vitrifiers, but that would increase the capital cost of the vitrifiers. Further, the combustible organic constituents in the waste contribute to increasing the quantity and volume of the vitrifier off-gas stream, requiring a larger off-gas stream treatment facility at increased capital and operational costs. Additionally, the presence of reductive carbon sources in combination with the reducing conditions of most glass melts and with the elevated operating temperatures of the vitrification process results in the metallic ions in the waste being converted to metals via carbothermic reduction reactions. This creates a poor encapsulation in that the metals are not included as readily into the glass matrix as metallic ions, the metal concentration may be higher than the metal solubility concentrations, and the resulting glass product has poor leaching and strength performance.

It is therefore desirable to provide a processing waste method and system that a delivers low-water, low-organic constituents waste stream.

SUMMARY OF THE INVENTION

The present invention provides a method and system for processing waste comprising drying and reforming a sludge stream of the waste with a first reformed effluent stream to produce a gas effluent stream and a solids effluent stream. The gas effluent stream is reformed further to produce the first effluent stream, which is then directed back to the sludge stream.

DETAILED DESCRIPTION OF THE PREFERRED EMBODIMENTS

Figure 1:
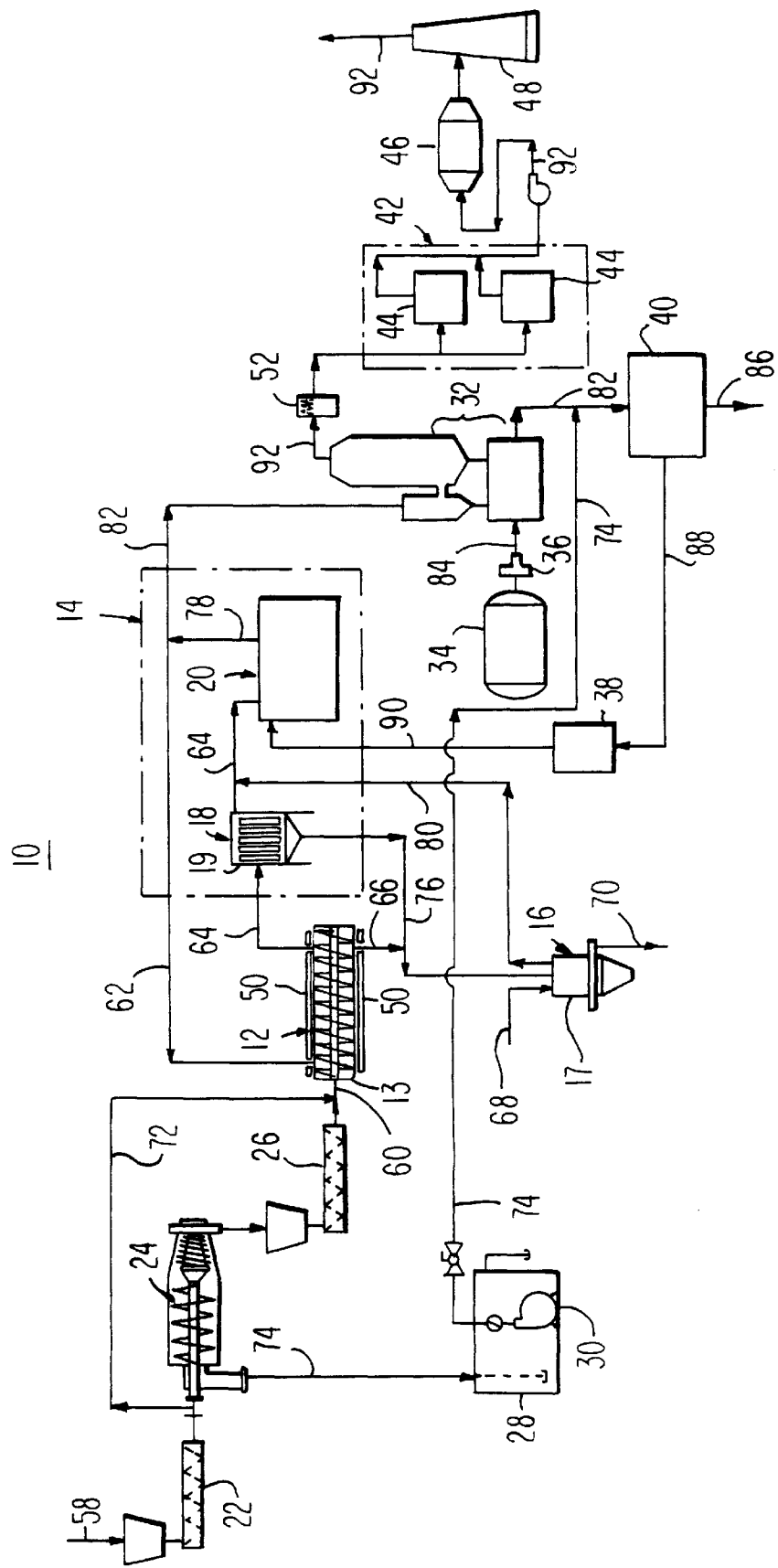
FIG. 1 is a schematic of an integrated steam reforming operation that processes a waste stream to produce encapsulated waste according to the present invention.

Referring to the drawings, wherein like reference numerals refer to like elements, and referring in particular to FIG. 1, in the preferred embodiment of the invention, a waste stream 58 is directed into a centrifugal means 24 via a progressing cavity pump 22. The centrifugal means 24 separates the waste stream 58 into a liquid centrate stream 74 and a sludge stream 60. In the preferred embodiment of the invention, a high solid waste bypass stream 72 is separated from the waste stream 58 and bypasses the centrifugal means 24 to be mixed with the sludge stream 60. The centrifugal means 24 may be one or more centrifuges. Other embodiments of the invention may use other suitable means for producing the sludge stream 60.

The sludge stream 60 and a first reform effluent stream 62 are combined in a reforming and drying means 12 to reform and dry the sludge stream 60. In the preferred embodiment of the invention, the sludge stream 60 is directed into the reforming and drying means 12 via a progressing cavity pump 26. The reforming process decomposes the organic constituents in the sludge stream to smaller organic molecules which are more easily driven from the sludge stream due to their relatively high evaporation rates. In the preferred embodiment of the invention, the reforming and drying means comprises an enclosed screw conveyer 13. The enclosed screw conveyer 13 breaks apart the sludge stream in order to increase the surface to volume ratio of the sludge stream and, thus, the contact area between the sludge stream and the first reform effluent stream. Increasing the surface to volume ratio of the sludge stream promotes heat and mass transfer between the sludge stream and the first reformed effluent stream 62 by decreasing the diffusion path/resistance for drying and improving contact efficiency of the sludge, which results in improved drying and reforming of the sludge stream. Other embodiments of the invention may have other means for increasing the surface to volume ratio of the sludge stream such as, for example, other types of agitators and other material deformation means, fluidized bed reforming evaporators, rotary dryers, thermal desorbers, and rotating kilns (not shown). Further, other embodiments of the invention may have the drying and reforming means be a batch or a semi-batch process, such as a drum feed evaporator, as opposed to the continuous process of a screw conveyor.

In order to promote the drying and reforming of the sludge stream, additional embodiments of the invention may have a heating means 50 to provide additional heating to the reforming and drying means 12. In the preferred embodiment of the invention, the heating means is an electrical heating jacket surrounding at least a portion of the enclosed screw conveyor 13. Other embodiments of the invention may have other suitable heating means, such as radiant or convection heaters.

The reforming and drying of sludge stream 60 results in a solid effluent stream 66 and a gas effluent stream 64. The solid effluent stream 66 has a greatly reduced organic constituent composition. In the preferred embodiment of the invention, the drying and reforming means 12 has an organic constituent destruction and removal efficiency ["DRE"] of at least approximately 99.99%. The resulting solid effluent stream 66 typically produced is a free-flowing residue. The agitation of the screw conveyor 13 in the preferred embodiment improves the flow quality of the solid effluent stream 66.

An embodiment of the invention may have the solid effluent stream 66 being directed to a vitrification means 16 comprising one or more vitrifiers 17. Examples of suitable vitrification means are disclosed in previously referenced U.S. Pat. Nos. 4,376,070; 4,759,879; 5,288,435; and 5,416,251 and are commercially available from EnVitCo, Inc., 3400 Executive Parkway, Toledo, Ohio, 43606-0451 as WASTE-VIT® Systems.

Figure 2:
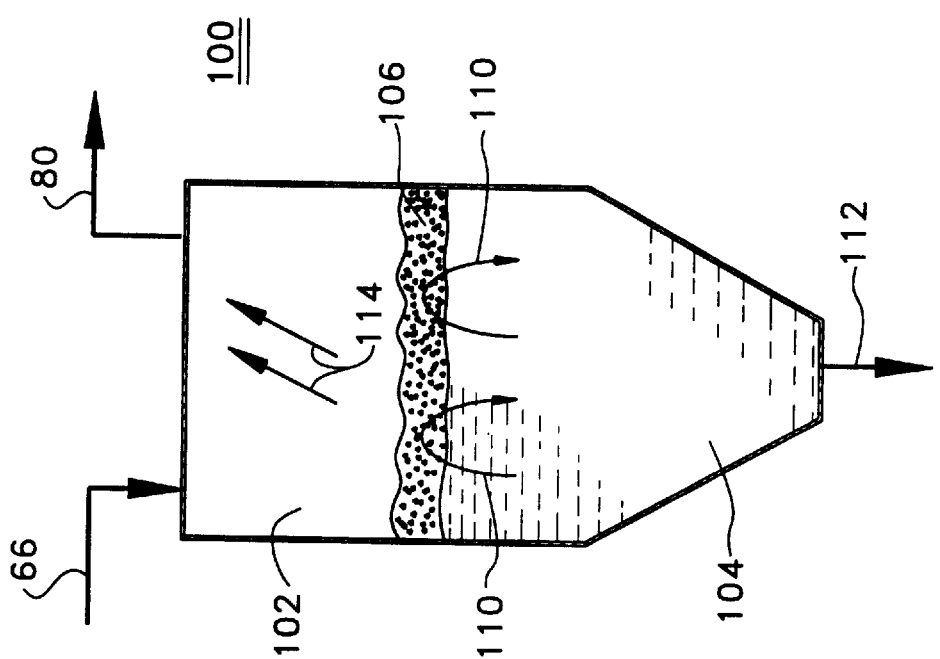
FIG. 2 is a schematic sectional view of a cold cap vitrifier.

Now referring to FIG. 2, in a preferred embodiment of the invention, the vitrification means 16 is one or more cold cap vitrifiers 100. The solids effluent stream 66 enters the cold cap vitrifier 100 and forms a blanket of undissolved solids 106 between a head space 102 and the molten glass 104. During operation of the cold cap vitrifier 100, the blanket 106 slowly dissolves into the molten glass 104, incorporating any metallic ions in the blanket into the glass matrix. This method of incorporation results in a glass product 112 that is relatively high in strength and leaching performance. Further, the blanket 106 condenses any metals volatilized in the molten glass 104 and recirculates them back into the molten glass, as shown by currents 110. This results in a relative reduction of volatilized metals in the gas 114 produced in the cold cap vitrifier 100. The gas 114 is released from the cold cap vitrifier as the vitrifier off-gas stream 80.

Figure 3:
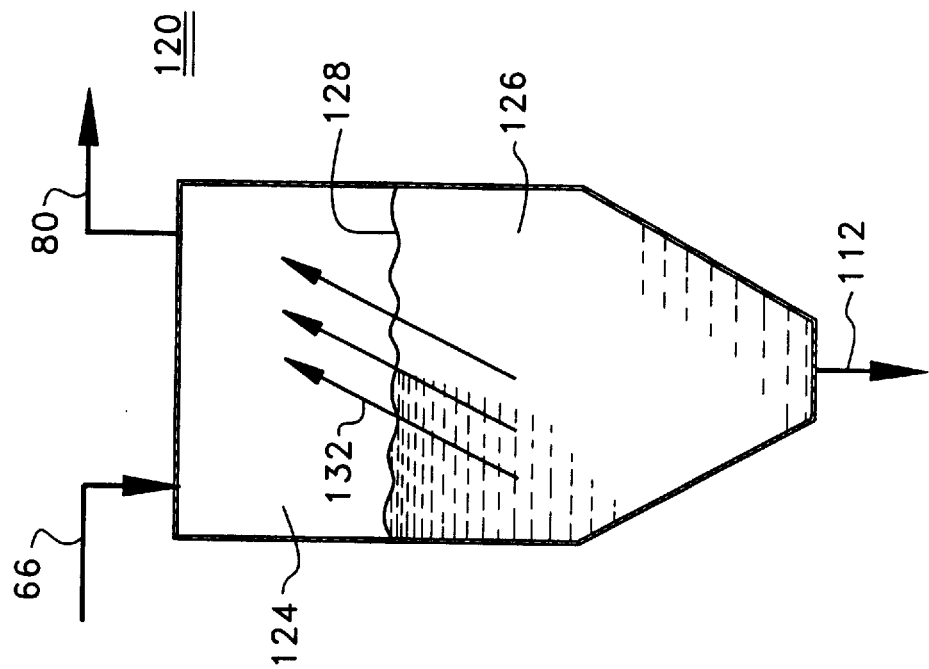
FIG. 3 is a schematic sectional view of a hot cap vitrifier.

Now referring to FIG. 3, in an alternative embodiment of the invention, the vitrification means 16 may have at least one hot cap vitrifier 120. The solids effluent stream 66 enters the hot cap vitrifier 120 and melts to form molten glass 126. Above the molten glass 126 is a head space 124 with an oxidizing atmosphere that is typically hotter than the head space 102 of the cold cap vitrifier 100. In the hot cap vitrifier 120, the higher temperature permits greater oxidation of any organic constituents in the solids effluent stream 66, especially at the molten glass/head space interface 128. However, an increased amount of volatilized metals 132 exit the hot cap vitrifier 120 through the vitrifier off-gas stream 80 compared to the cold cap vitrifier 100. For example, cold cap vitrifiers have been shown to have a >90% capture efficiency of cesium compared to hot cap vitrifiers.

Referring back to FIG. 1, a glass former stream 68 is added to the vitrification means 16 as required to form an encapsulated waste stream 70 from the solid effluent stream 66. Due to the removal of the water and the organic constituents from the sludge stream 60 to produce the solids effluent stream 66, the size and cost of the vitrifiers 17 is kept to a minimum, thus saving capital and operating costs. The vitrification means 16 also produces a vitrifier off-gas stream 80 which is comprised of the gases generated during the encapsulation of the solid effluent stream 66. Due to the drying and reforming of the sludge waste stream 60 in the reforming and drying means 12, the quantity and volume of the vitrifier off-gas stream 80 is reduced.

Other embodiments of the invention may encapsulate the solid effluent stream by other means, for example, the use of concrete or grout for encapsulation as generally disclosed in U.S. Pat. No. 4,504,317 to Smeltzer et al. entitled "Encapsulation of Boric Acid Slurries," which is incorporated by reference in its entirety herein. In the case of encapsulating the solid waste stream 66 in concrete or grout, the present invention results in a much reduced volume of encapsulated waste compared to encapsulating the non-dried and non-reformed sludge stream 60 directly therein.

The gas effluent stream 64 is directed to a reforming means 14. The gas effluent stream 64 contains many of the constituents of the sludge stream 60 that would typically contribute to the quantity and volume of the vitrifier off-gas stream 80, abet in shorter chain molecules for the organic constituents. The reforming means 14, in the preferred embodiment, comprises a filter means 18 and a steam reforming system 20. The filter means 18 removes particulates which might be present in the gas effluent stream 64. These particulates are combined to form a filtered solid stream 76, which combines with the solid effluent stream 66 and is directed to the vitrification means 16 for encapsulation. In the preferred embodiment of the invention, the filter means comprises a candle filter system 19. Examples of suitable candle filter systems are commercially available from Fisher-Klosterman, Inc., 2901 Magazine Street, Louisville, Ky. 40251-0190. Other embodiments of the invention may use other suitable particulate removal means, such as high temperature bag houses.

After passing through the filter means 18, the gas effluent stream 64 enters the steam reforming system 20 and is reformed therein with a flow of steam 90. As in the reforming and drying means 12, the organic constituents present in the gas effluent stream 64 are decomposed to lower molecular weights in the steam reforming system 20. Examples of suitable stream reforming systems are described in U.S. Pat. No. 4,863,702 to Galloway et al. entitled "Autoclave for Hazardous Waste;" for U.S. Pat. No. 4,874,587 to Galloway entitled "Hazardous Waste Reactor System;" U.S. Pat. No. 5,292,695 to Galloway entitled "Process for Reactivating Particulate Absorbents;" U.S. Pat. No. 5,322,116 to Galloway et al. entitled "Very High Temperature Heat Exchanger;" and U.S. Pat. No. 5,427,738 to Galloway entitled "Method and System for Detoxifying Solid Waste;" all of which are incorporated in their entireties by reference herein. In the preferred embodiment of the invention, the steam reforming system 20 operates at 1,800 F to 2,400 F, essentially completing destruction of the volatilized organic constituents in the gas effluent stream 64. See U.S. Pat. No. 5,470,544 to Galloway entitled "System for Steam-Reforming of Liquid or Slurry Feed Material;" and Galloway, T. R. and Depetris, S., On-site Bio-hazardous Waste Destruction with the Synthetica Steam Detoxifier—Test Organism Kill & Chlorocarbon Destruction (DRE's of 99.9999% when reformation temperatures exceed 2100 F), both of which are incorporated by reference in their entireties herein.

The steam reforming system 20 produces a combined effluent stream 78, which is split into the first reformed effluent stream 62 and a second reformed effluent stream 82. These streams have a high steam content due to the reforming process. This results in the first reformed effluent stream 62 being used for reforming and drying the sludge stream 60 in the drying and reforming means 12, thus integrating it with the steam reforming system 14.

The second reform effluent stream 82 is directed to a quencher/scrubber system 32. In the preferred embodiment, the second reformed effluent stream 82 is scrubbed with a caustic solution stream 84 which is supplied from a caustic storage tank 34 and metered into the quencher/scrubber system 32 via a metering pump 36. From the second reformed effluent stream 82, the quencher/scrubber system 32 produces a scrubber gas effluent stream 92. The scrubber gas effluent stream 92 is directed into a gas heater 52 and through a multiple carbon bed system 44 which are regenerated using a drum evaporator and steam reformer (not shown). Then, the scrubber gas effluent stream is directed through a high efficiency particulate air filter system 46 and discharged through a stack 48. Due to the minimized volume and quantity of the vitrifier off-gas stream 80, the size of the carbon bed system 42 and the high efficiency particulate air filter system 46 will be reduced compared to non-integrated systems treating equivalent waste streams.

After exiting the quencher/scrubber system 32, the second reformed effluent stream 82 is directed to a waste water treatment system 40. In the preferred embodiment of the invention, the centrate stream 74 is delivered to a centrate tank system 28 and is pumped into the waste treatment system 40, also, via a centrate pumping means 30. The waste water treatment system 40 treats the streams in order to remove the contaminants and produce a waste water discharge stream 86. In a preferred embodiment, the waste water treatment system 40 also produces a make-up water stream 88 which is directed to a boiler system 38. Boiler systems in other embodiments of the invention may have other sources of water. The boiler system 38 produces the flow of steam 90 which is used in the steam reforming means 14 as described above. An embodiment of the invention may have at least a portion of the solids that are generated during the treatment of the water in the waste water treatment system 40 directed to the reforming and drying means 12 (not shown).

Thus, the present invention provides an integrated reforming system that permits for low capital and operating costs to produce a dry, low-carbon solid effluent stream 66 from the waste stream 58. Embodiments of the invention encapsulate the stream 66 in a number of ways. Although the invention has been discussed with reference to a waste stream comprising water and organic constituents, the invention may be practiced with waste streams having additional constituents. Further, the invention may be practiced with multiple screw conveyors, candle filters, steam reformers, and vitrifiers in their respective systems, for example. Accordingly, the present invention may be embodied in other specific forms without departing from the spirit or essential attributes thereof and, accordingly, reference should be made to the appended claims, rather than to the foregoing specification, as indicating the scope of the invention.

We claim:

1. A method of processing waste comprising the steps of:
    a) drying and reforming a sludge stream, comprising waste, with a first reformed effluent stream to produce a gas effluent stream and a solids effluent stream therefrom;
    b) filtering the particulates from the gas effluent stream to produce a filtered solids stream which is added to the solids effluent stream and steam reforming the gas effluent stream to produce the first reformed effluent stream therefrom;
    c) directing the first reformed effluent stream to the sludge stream.

2. The processing waste method of claim 1 further comprising the step of vitrifying the solids effluent stream to produce encapsulated waste therefrom.

3. The processing waste method of claim 2, wherein:
    a) the reforming step further comprises the step of combining a vitrifier off-gas stream with the gas effluent stream; and
    b) the vitrifying step further comprises the step of producing the vitrifier off-gas stream.

4. The processing waste method of claim 3, wherein:
    a) the drying and reforming step further comprises the steps of:
        i) increasing the surface to volume ratio of the sludge stream by directing the sludge stream through surface changing means; and
        ii) heating the surface changing means with heating means;
    b) the reforming step further comprises the step of combining a vitrifier off-gas stream with the gas effluent stream; and
    c) the vitrifying step further comprises the step of vitrifying the filtered solids stream to produce the vitrifier off-gas stream at least partially therefrom.

5. The processing waste method of claim 4, wherein the increasing the surface to volume ratio of the sludge stream step further comprises the step of directing the sludge stream and the first reformed effluent stream through the surface changing means which is selected from the group consisting of an enclosed screw conveyor, material deformation means, a fluidized bed reforming evaporator, a rotary dryer, a thermal desorber, a rotating kiln, or a drum feed evaporator.

6. The processing waste method of claim 5, wherein the increasing the surface to volume ratio of the sludge stream step further comprises the steps of:
    a) directing the sludge stream and the first reformed effluent stream through an enclosed screw conveyor; and
    b) heating the enclosed screw conveyor with an electrical heating jacket.

7. The processing waste method of claim 6, further comprising the steps of:
    a) centrifuging a waste stream to form a centrate stream and the sludge stream;
    b) directing the centrate stream to the waste water treatment system; and c) quenching and scrubbing the second reformed effluent stream to form a scrubber gas effluent stream.

8. The processing waste method of claim 2, wherein:
the vitrifying step further comprises the step of vitrifying the filtered solids stream.

9. The processing waste method of claim 2,
   a) wherein a reforming step which further comprises the steps of
      i) receiving a flow of steam; and
      ii) reforming the gas effluent stream with the flow of steam to produce a second reformed effluent stream; and
   b) said method further comprising the steps of:
      i) directing the second reformed effluent stream into a waste water treatment system; and
      ii) directing a make-up water stream from the waste water treatment system to a boiler system for producing the flow of steam therefrom.

10. The processing waste method of claim 2, wherein the vitrifying step further comprises the step of vitrifying at least a portion of the solids effluent stream in a cold cap vitrifier.

11. A waste processing system comprising:
    a) reforming and drying means for receiving a sludge stream and a first reformed effluent stream, drying and reforming the sludge stream with the first reformed effluent stream, and producing a solids effluent stream and a gas effluent stream for producing a gas effluent stream therefrom; and
    b) filtering means connected to receive the gas effluent stream for filtering particles from the gas effluent stream, for producing a solids stream therefrom, and for discharging the gas effluent stream and a steam reforming means connected to receive the gas effluent stream for producing the first reformed effluent stream.

12. The system of claim 11, further comprising vitrifying means connected to receive the solids effluent stream for producing encapsulated waste therefrom.

13. The system of claim 12, wherein the reforming and drying means comprises surface changing means for increasing the surface to volume ratio of the sludge stream.

14. The system of claim 13, wherein the surface changing means is selected from the group consisting of an enclosed screw conveyor, material deformation means, a fluidized bed reforming evaporator, a rotary dryer, a thermal desorber, a rotating kiln. or a drum feed evaporator.

15. The system of claim 13, wherein the surface changing means comprises an enclosed screw conveyor.

16. The system of claim 13, further comprising heating means for heating the surface changing means.

17. The system of claim 13, further comprising:
    a) a waste water treatment system connected to receive at least a portion of a second reformed effluent stream for producing a make-up water stream therefrom; and
    b) a boiler system connected to receive the make-up water stream for producing a flow of steam therefrom;
    wherein the reforming means is connected to receive the flow of steam, and produces the second reformed effluent stream at least partially therefrom.

18. The system of claim 17, further comprising:
    a) centrifugal means connected to accept a waste stream for producing the solid sludge stream and a centrate stream therefrom;
    b) means for delivering at least a portion of the centrate stream to the waste water treatment system; and
    c) a quencher/scrubber system connected to receive the second reformed effluent stream for scrubbing the second reformed effluent stream prior to directing the second reformed effluent stream to the waste water treatment system, and for producing a scrubber gas effluent stream.

19. The system of claim 18, further comprising:
    a) candle filter system connected to receive the gas effluent stream for filtering particulates from the gas effluent stream, for producing a filtered solids stream, and for discharging the gas effluent stream; and
    b) means for delivering the filtered solids stream to the vitrifying means;
    wherein the first reforming means is an enclosed screw conveyor with an electrical heating jacket.

20. The system of claim 12, wherein the vitrifying means comprises at least a cold cap vitrifier.

21. The system of claim 11, further comprising means for delivering the filtered solids stream to the vitrifying means.

22. The system of claim 21, wherein the filter means comprises a candle filter system.

23. A method of processing waste comprising the steps of:
    a) drying and reforming a sludge stream, comprising waste, with a first reformed effluent stream to produce a gas effluent stream and a solids effluent stream therefrom;
    b) vitrifying the solids effluent stream to produce encapsulated waste and a off-gas stream; and
    c) reforming a gas stream which comprises the gas effluent stream and the vitrified off-gas stream to produce the first reformed effluent stream therefrom; and
    d) directing the first reformed effluent stream to the sludge stream.

24. A waste processing stream comprising:
    a) reforming and drying means for receiving a sludge steam and a first reformed effluent stream wherein the reforming and drying means comprises surface changing means for increasing the surface to volume ratio of the sludge stream and the surface changing means is selected from the group consisting of an enclosed screw conveyor, material deformation means, a fluidized bed reforming evaporator, a rotating kiln or a drum feed evaporator, drying and reforming the sludge stream with the first reformed effluent stream, and producing a solids effluent stream and a gas effluent stream therefrom;
    b) reforming means connected to receive the gas effluent stream for producing the first reformed effluent stream; and
    c) vitrifying means connected to receive the solids effluent stream for producing encapsulated waste therefrom.

* * * * *